US008398302B2

(12) United States Patent
Hori

(10) Patent No.: US 8,398,302 B2
(45) Date of Patent: Mar. 19, 2013

(54) TEMPERATURE SENSOR FOR EXHAUST SYSTEMS

(75) Inventor: Tsunenobu Hori, Kariya (JP)

(73) Assignee: Denso Corporation, Kariya (JP)

( * ) Notice: Subject to any disclaimer, the term of this patent is extended or adjusted under 35 U.S.C. 154(b) by 500 days.

(21) Appl. No.: 12/596,271

(22) PCT Filed: Apr. 16, 2008

(86) PCT No.: PCT/JP2008/057404
§ 371 (c)(1),
(2), (4) Date: Mar. 16, 2010

(87) PCT Pub. No.: WO2008/133134
PCT Pub. Date: Nov. 6, 2008

(65) Prior Publication Data
US 2010/0195698 A1 Aug. 5, 2010

(30) Foreign Application Priority Data

Apr. 16, 2007 (JP) .................................. 2007-107515
Apr. 11, 2008 (JP) .................................. 2008-103998

(51) Int. Cl.
*G01K 1/08* (2006.01)
*G01K 1/14* (2006.01)
*G01K 13/00* (2006.01)

(52) U.S. Cl. .................. 374/148; 73/114.69; 73/114.75

(58) Field of Classification Search .................... 374/148
See application file for complete search history.

(56) References Cited

U.S. PATENT DOCUMENTS

| 6,651,422 | B1 * | 11/2003 | LeGare | 60/277 |
| 2004/0218662 | A1 * | 11/2004 | Hanzawa et al. | 374/185 |
| 2006/0176931 | A1 * | 8/2006 | Miyahara et al. | 374/208 |

FOREIGN PATENT DOCUMENTS

| JP | 2002-350239 | 12/2002 |
| JP | 2005-241395 | 9/2005 |

(Continued)

OTHER PUBLICATIONS

Written Opinion for PCT/JP2008/057404, dated Nov. 10, 2009, 5 pages.

(Continued)

*Primary Examiner* — Lisa Caputo
*Assistant Examiner* — Roger Hernandez-Prewitt
(74) *Attorney, Agent, or Firm* — Nixon & Vanderhye P.C.

(57) ABSTRACT

A protruding length L1 that is a distance between an inner circumference of a flow path through which fluid flows on an axis of a temperature sensor disposed in the flow path and the center of said temperature sensitive device is 50 mm or more. A protruding location that is a distance between an inner circumferential surface of the flow path and the center of said temperature sensitive device on a cross section extending perpendicular to the axis of said flow path through the center of said temperature sensitive device is defined as L1'. A flow path width that is a distance between intersections of the axis of the temperature sensor with the inner circumferential surface of said flow path when the temperature sensor is projected onto said cross section is defined as D1. A relation of L1'/D1 is specified as a function of the value of D1, thereby reducing heat transfer in an exhaust temperature sensor and enabling the temperature to be measured accurately.

14 Claims, 10 Drawing Sheets

FOREIGN PATENT DOCUMENTS

| | | |
|---|---|---|
| JP | 2006-47273 | 2/2006 |
| JP | 2008-281548 | 11/2008 |
| JP | 2008-286789 | 11/2008 |
| WO | WO 2008/093766 | 8/2008 |
| WO | WO 2008/133135 | 11/2008 |

OTHER PUBLICATIONS

International Search Report for PCT/JP2008/057404, mailed Jul. 22, 2008.

* cited by examiner (a)

(b)

A-A CROSS SECTION                    B-B CROSS SECTION (a)

(b)

(a)

(b)

TEMPERATURE SENSOR FOR EXHAUST SYSTEMS

This application is the U.S. national phase of International Application No. PCT/JP2008/057404 filed 16 Apr. 2008, which designated the U.S. and claims priority to Japan Application Nos. 2007-107515 filed 16 Apr. 2007 and 2008-103998 filed 11 Apr. 2008, the entire contents of each of which are hereby incorporated by reference.

TECHNICAL FIELD

The present invention relates generally to a temperature sensor to be installed in an exhaust system of internal combustion engines.

BACKGROUND ART

There are known so-called exhaust temperature sensors which measure the temperature of exhaust gas flowing through a path such as the inside of a catalytic converter or an exhaust pipe of automobile exhaust emission control device using a thermo-sensitive device.

The thermo-sensitive device whose electric characteristics are sensitive to the temperature is disposed inside a cover. An electric signal produced by the thermo-sensitive device whose electric characteristics are sensitive to the temperature is transmitted through electrode wires to a control device in which the temperature is to be measured.

Such a temperature sensor, as shown in the patent document 1, has the thermo-sensitive device disposed near the catalytic converter or the center of the exhaust pipe to ensure the accuracy in measuring the temperature of gas (maximum temperature) entering the catalytic converter.

The patent document 2 discloses a temperature sensor in which a relation between length of a portion of the temperature sensor protruding into the catalytic converter and length of a platinum resistor to measure the temperature of exhaust gas is specified to measure the temperature accurately and easily.

Patent Document 1: Japanese Patent First Publication No. 2002-350239
Patent Document 2: Japanese Patent First Publication No. 5-79922

DISCLOSURE OF THE INVENTION

Problem to be Solved by the Invention

However, the patent document 1 states that the measurement of the temperature of a central portion of the catalytic converter or the exhaust pipe is desirable, but is silent about a specific method in terms of the diameter of a flow path or the length of the portion of the temperature sensor protruding into the flow path.

For example, the installation of the temperature sensor in the catalytic converter that is an exhaust pipe equipped with a large-diameter catalyzer to measure the central portion of the catalytic converter requires lengthening of a portion of the temperature sensor protruding into the catalytic converter. However, the prior art temperature sensor has a decreased length of the protruding portion to increase the resonance frequency thereof for avoiding the resonance arising from external vibrations. Therefore, when the catalytic converter is great in diameter thereof, it will result in a drop in resonance frequency of the temperature sensor to facilitate the resonance of the temperature sensor, which leads to the damage to the temperature sensor. Such a problem is not yet considered at all.

Similarly, in the patent document 2, the increase in length of a portion of the temperature sensor protruding into the catalytic converter to measure the temperature of the central portion of the catalytic converter will result in a difficulty in ensuring the durability in the exhaust system whose vibration level is high or the catalytic converter whose inner diameter is great. Particularly, platinum resistor-type temperature sensors have the high degree of rigidity which increases the resonance frequency thereof, thus resulting in greatly increased acceleration acting on the temperature sensor, so that excessive stress is exerted on the temperature sensor, which causes the breakage thereof.

The measurement of the temperature of the central portion of the catalytic converter using the high-resonance frequency temperature sensor (having a decreased protruding length) based on the above described technical idea to avoid the resonance requires, as shown in FIG. 2, the installation of the temperature sensor in a tapered portion of a catalytic case. This method, however, results in an increase in amount of heat transfer caused by a decrease in length of the temperature sensor protruding into the catalytic converter or the exhaust pipe, which will lead to a difficulty in measuring the temperature of gas (i.e., the maximum temperature) entering the catalyzer accurately.

Further, in recent years, exhaust systems using a plurality of catalyers have become mainstream as techniques for reducing emissions. It's object is, however, to minimize the protruding length in order to enhance the vibration resistance, as described above, and measure the temperature of the central portion of the catalytic converter. Consequently, the structure of FIG. 12 is small in the above described protruding length, so that the heat transfer is great, and is distant from the downstream catalyzer, thus resulting in a difficulty in measuring the temperature of gas entering the catalyzer and also in an increase in production cost due to the complexity of the structure of the exhaust system.

The present invention was made in order to solve the prior art problems. It is an object to provide a temperature sensor which measures the temperature (i.e., a maximum temperature) of gas entering a catalyzer accurately and ensures the vibration resistance required by an exhaust system in which a vibration level is high.

Means for Solving Problem

In order to achieve the above object, the present invention is a temperature sensor including a temperature sensitive device which is disposed in a flow path through which fluid flows and whose electric characteristic changes as a function of temperature of the fluid in the flow path, signal lines connected at top end sides thereof to said temperature sensitive device through electrode wires and at base end sides thereof to lead wires for connection with an external circuit, a sheath member retaining the signal lines therein, and a holding member which holds an outer circumferential surface of said sheath member directly or indirectly through another member, characterized in that a protruding length L1 that is a distance between an inner circumference of said flow path on an axis of the temperature sensor and a center of said temperature sensitive device is 50 mm or more, and if a protruding location that is a distance between an inner circumferential surface of the flow path and a center of said temperature sensitive device on a cross section extending perpendicular to an axis of the flow path through the center of said temperature sensitive device is defined as L1', and a flow path width that is a distance between intersections of the axis of the temperature sensor with the inner circumferential surface of the flow path when the temperature sensor is projected onto said cross section is defined as D1, a relation below is met.

$$L1'/D1 \geq \{0.6-(1/1000) \times D1\} \text{ when } 100 \text{ mm} \leq D1 < 200 \text{ mm},$$

$$L1'/D1 \geq \{0.74-(1/600) \times D1\} \text{ when } 200 \text{ mm} \leq D1 < 300 \text{ mm},$$

or $$L1'/D1 \geq 0.24 \text{ when } 300 \text{ mm} \leq D1.$$

In this case, the accurate measurement of the temperature (a maximum temperature) of a central portion of the flow path is achieved by specifying the suitable protruding location L1' of the temperature sensor depending upon the shape of the flow path such as circular or oval. Simultaneously, the heat transfer from the temperature sensor itself is decreased by setting the protruding length L1 to 50 mm or more, thereby enabling the temperature of the fluid to be measured accurately.

Moreover, the present invention is characterized in that the protruding length L1 that is a distance between an inner circumference of said flow path on an axis of the temperature sensor and a center of said temperature sensitive device is 50 mm or more, and if a flow path inner diameter on a cross section extending through the center of said temperature sensitive device perpendicular to an axis of the flow path is defined as D1', and a diameter of a circle whose radius is a distance between a center of the flow path having the flow path inner diameter D1' and the center of said temperature sensitive device is defined as D2, a relation below is met.

$$D2/D1' \leq \{(1/500) \times D1' - 0.2\} \text{ when } 100 \text{ mm} \leq D1' < 200 \text{ mm},$$

$$D2/D1' \leq \{(1/300) \times D1' - 0.47\} \text{ when } 200 \text{ mm} \leq D1' < 300 \text{ mm},$$

or $$D2/D1' \leq 0.53 \text{ when } 300 \text{ mm} \leq D1'.$$

The present invention may be applied, especially when the shape of the flow path is circular. The accurate measurement of the temperature (maximum temperature) of the central portion of the flow path is achieved by defining the diameter D2 of an optimum imaginary circle as a function of the inner diameter of the circular flow path. The heat transfer from the temperature sensor itself is reduced by prolonging the protruding length L1 to 50 mm or more, which results in the accurate measurement of the temperature of the fluid.

The present invention is characterized in that if a held length that is a distance between a top end of a portion of said sheath member which is held by the holding member directly or indirectly and the center of said temperature sensitive device is defined as L2, a relation to the protruding length L1 is L2>L1.

Specifically, the held portion of the sheath member is provided on the base end side of the holding member, thereby increasing the range of the held length L2 to an elongated side more than the conventional one. Even when the protruding length L1 is small, the resonance (primary) frequency of the sheath member may be decreased by prolonging the held length L2. This avoids the breakage of the electrode wires located on the top end side of the temperature sensor and the damage to the temperature sensitive device arising from the resonance.

The present invention is characterized in that if a diameter of a portion of the protruding length L1 which holds said temperature sensitive device is defined as a sensor outer diameter D3, the sensor outer diameter D3 is 3.5 mm or less.

This results in a decrease in the protruding length L1 and reduce the heat transfer.

The present invention is characterized in that the protruding length L1 is 60 mm or more, and the sensor outer diameter D3 is 3.2 mm or less.

This results in a sufficient decrease in the heat transfer when said protruding length L1 and the sensor outer diameter D3 are satisfied at the same time, thereby enhancing the accuracy in measuring the temperature through the temperature sensitive device.

The present invention is characterized in that the sensor outer diameter D3 is 1.7 mm or more.

This ensures the resistance of a protruding portion of the temperature sensor to vibration exerted from the flow path such as an exhaust pipe, thus avoiding the breakage of the protruding portion.

The present invention is characterized in that the temperature sensor is disposed between at least two catalyzers installed in the flow path. This ensures the accuracy in measuring the temperature of gas entering the downstream catalyzer in the flow path.

The present invention is characterized in that if an interval between the adjacent two catalyzers is defined as L3, and a distance between the center of said temperature sensitive device and an upstream end surface of one of the catalyzers which is located downstream of the flow path is defined as L4, a relation of L4<(L3)/2 is met.

This enables the temperature sensor to measure the temperature of entering gas to be measured in close proximity to the downstream catalyzer, thereby increasing the accuracy of bed temperature control of the downstream catalyzer.

In the temperature sensor of this invention, the temperature sensitive device preferably has any of following structures. The temperature sensitive device is characterized as being disposed inside a metallic cover. This shields the temperature sensitive device from the atmosphere of exhaust gas to avoid the reduction-caused deterioration of the temperature sensitive device.

The temperature sensitive device is characterized as being implemented by a thermister. This realizes the temperature sensor easily which is high in measurement accuracy.

The temperature sensitive device is characterized as being embedded in a fixing member supplied inside a top end of said metallic cover. This avoids collision of the temperature sensitive device with the metallic cover when the temperature sensor vibrates, so that the temperature sensitive device swings, thus avoiding the breakage of the temperature sensitive device and disconnection of electrodes of the temperature sensitive device. This provides the temperature sensor which is excellent in durability.

The temperature sensitive device is characterized as being sealed by glass. This reduces the deterioration of the temperature sensitive device and provides the temperature sensor which is excellent in durability.

DESCRIPTION OF REFERENCE NUMBERS

| | |
|---|---|
| 10 | temperature sensitive portion |
| 20 | case |
| 100 | exhaust temperature sensor (temperature sensor) |
| 101 | thermister (thermo-sensitive device) |
| 102 | electrode wire |
| 103 | sheath pin core wire (metal core wire) |
| 104 | temperature-sensitive portion cover (cover) |
| 105 | sheath pin (sheath member) |
| 106 | fixing member |
| 107 | glass material |
| 201 | rib (holding member) |
| 201a | top end interference portion |
| 202 | protection tube (holding member) |
| 203 | nipple |
| 204 | lead wire |
| 205 | holder tube |
| 205a | top end interference portion |
| 301 | boss |
| 400 | catalytic converter |
| 401 | catalytic case |
| 402 | catalyzer |
| 402a | upstream catalyzer |
| 402b | downstream catalyzer |
| 403 | exhaust pipe |
| 500 | thermocouple |

BEST MODES CARRYING OUT THE INVENTION

Embodiments of an exhaust temperature sensor 100 (temperature sensor) according to the invention will be described below based on drawings. The exhaust temperature sensor 100 is applied as a sensor to measure the temperature of exhaust gas emitted from an automotive engine and to be installed in, for example, an exhaust pipe of automobiles.

Figure 1:
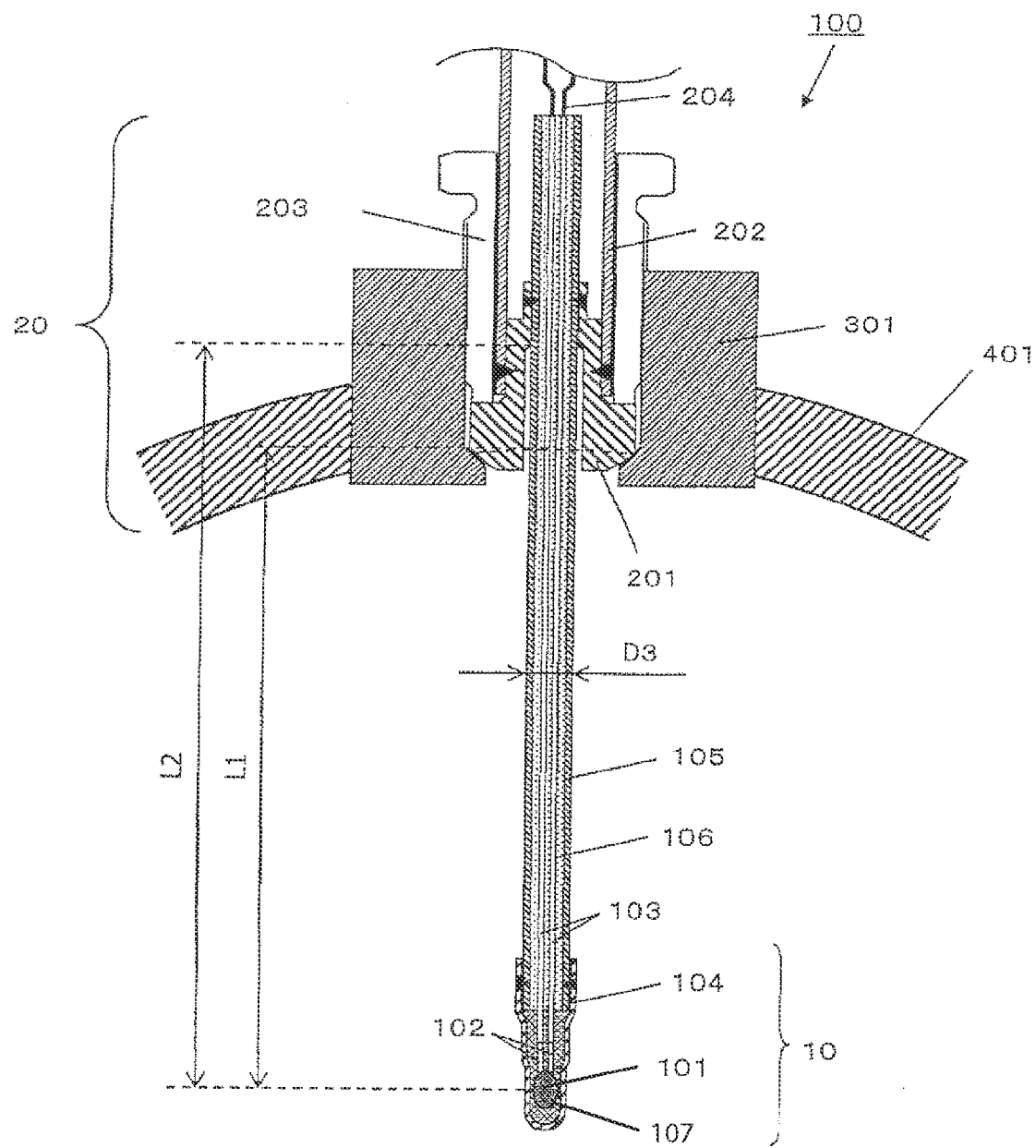
FIG. 1 is a cross sectional view which shows an embodiment of an exhaust temperature sensor of the present invention.

As illustrated in FIG. 1, the exhaust temperature sensor 100 consists essentially of a temperature sensitive portion 10, a case 20, and a sheath pin 105 disposed between the temperature sensitive portion 10 and the case 20.

In this specification, the lower side and the upper side of FIG. 1 will be referred to below as a top end side and a base end side, respectively, in explanation of the structure of the exhaust temperature sensor 100.

Next, the temperature sensitive portion 10 will be described. The temperature sensitive portion 10 is formed by a sintered body made of semiconductor material whose main component is Cr—Mn. The temperature sensitive portion 10 includes a thermister 101 that is a temperature sensitive device sensitive to the temperature of exhaust gas, a pair of electrode wires 102 which transmits an electric signal, as produced by the thermister 101 to the base end side, a pair of signal lines 103 whose top end is joined at the base end side of the electrode wires 102 through laser welding or resistor welding and other end is connected to lead wires 204, and a temperature sensitive portion cover 104 that is a metallic cover to protect the thermister 101. The signal lines and the electrode wires 102 are made of platinum material. The signal lines are made of stainless steel. The temperature sensitive portion cover 104 is made of Inconel material shaped by the deep drawing into a bottomed cylinder.

The thermister 101 is preferably used as a temperature sensitive device to make the exhaust temperature sensor easily which has a high measurement accuracy.

The thermister 101 is preferably disposed inside the temperature sensitive portion cover 104 to shield the thermister 101 from the exhaust gas in order to avoid the deterioration of the thermister 101.

A fixing member is preferably disposed between the thermister 101 and the temperature sensitive portion cover 104 to avoid collision of the thermister 101 with the temperature sensitive portion cover 104 when the exhaust temperature sensor vibrates, so that the thermister 101 oscillates. This avoids the damage to the thermister 101 and disconnection of the electrode lines 102 of the thermister 101.

As the fixing material, material which is excellent in thermal conductivity may be used to accelerate the transmission of heat outside the temperature sensitive portion cover 104 to the thermister 101, thereby achieving the exhaust temperature sensor which is excellent in response.

Further, the temperature sensitive portion cover 104 preferably uses alloy such as Inconel that is excellent in oxidation resistance, thereby avoiding the oxidation of the temperature sensitive portion cover 104 and avoiding a change in characteristic of the thermister 101 arising from a decrease in concentration of oxygen in the temperature sensitive portion cover 104. The oxidation of the temperature sensitive cover 104 usually results in a drop in concentration of oxygen in the cover. This may cause the oxygen to be removed from the thermister 101 to compensate for the drop in the concentration of oxygen, thereby changing the characteristics of the thermister 101. This is avoided by making the temperature sensitive portion cover 101 by the anti-oxidation metal.

As the anti-oxidation metal, there is, for example, stainless steel or Inconel (registered trade mark of Inconel company).

In the thus constructed temperature sensitive portion 10, the sheath pin 105 which corresponds to a sheath member is inserted and disposed at an end thereof.

The sheath pin 105 is cylindrical and made of Inconel. The sheath pin 105 is secured to the temperature sensitive portion cover 104 by crimping or laser-welding. The sheath pin 105 may be press-fitted or resistor-welded into the temperature sensitive portion cover 104.

The thermister 101 is preferably sealed by a glass sealing member This reduces the deterioration of the temperature sensitive device and makes it excellent in durability.

The sheath pin 105 has the signal lines 103 disposed therein and insulates and protects them. The sheath pin 105 has disposed therein powder such as electrically insulating magnesia which is loaded into the sheath pin 105 and then compressed by drawing the sheath pin 105 by means of swaging.

The sheath pin 105 includes the two signal lines 103 made of stainless steel, the insulating portion made of insulating powder such as magnesia disposed around the signal lines 103, and an outer tube portion made of stainless steel surrounding the outer periphery of the insulating portion. The sheath pin 105 has a cylindrical shape. The outer tube portion has a hollow cylindrical shape. The signal lines 103 are exposed from the insulating portion and the outer tube portion to the top end side and the base end side. The signal lines 103 are welded at top ends thereof to the electrode wires 102 of the thermister 101 and at base ends thereof to the lead wires 204.

Next, the case 20 will be described below. The case 20 serves to install the exhaust temperature sensor 100 to the exhaust pipe and is joined to the temperature sensitive portion 10 through the sheath pin 105 corresponding to the sheath member.

The case 20 includes a rib 201 coupled to the outer periphery of the sheath pin 105, a protection tube 202 welded to the outer periphery of the rib 201, and the lead wires 204 connected electrically to the base end of the sheath pin 105.

In FIG. 1, a substantially integrated member formed by securing the rib 201 and the protection tube 202 together through laser-welding corresponds to a holding member.

Next, installation of the exhaust temperature sensor 100, as illustrated in FIG. 1, in the flow path will be described with reference to FIGS. 2(a) and 2(b). FIGS. 2(a) and 2(b) illustrate cases where the exhaust temperature sensor 100 is disposed vertically and diagonally to the exhaust pipe 400, respectively. FIG. 2(a) is an axial sectional view of the exhaust pipe 400. FIG. 2(b) are sectional views which are taken along lines A-A and B-B in FIG. 2(a) traversing the axial direction of the exhaust pipe 400.

As illustrated in FIG. 1, a boss 301 is fixed in the exhaust pipe 400 which corresponds to the flow path. The boss 301 has an internal thread formed on an inner circumferential surface thereof. The installation of the exhaust temperature sensor 100 in the exhaust pipe 400 is achieved by pressing it to the top end side in contact of the nipple 203 with the base end surface of the rib 201 and, at the same time, engaging an external thread of the nipple 203 with the internal thread of the boss 301.

The top end surface of the rib 201 is seated firmly on the inner peripheral surface of the boss 301 to hermetically seal the exhaust gas flowing inside the exhaust pipe 400.

The thus constructed exhaust temperature sensor 100 outputs an exhaust gas temperature signal, as produced by the thermister 101, to an external circuit (e.g., an ECU) not shown through the lead wires 204 to detect the temperature of the exhaust gas.

The fixing of the rib 201 and the protection tube 202 is achieved by placing a portion of the outer circumferential surface of the rib 201 in abutment with the inner circumferential surface of the protection tube 202 and welding the outer circumferential surface of the protection tube 202.

The sheath pin 105 is fit in a central hole of the rib 201. The sheath pin 105 and the rib 201 are welded together at a contact between the inner circumferential surface of the rib 201 and the outer circumferential surface of the sheath pin 105.

The holding member, as referred to in this specification, is the substantially integrated member made by laser-welding the rib 201 and the protection tube 202. A held portion of the sheath member is a contact between the sheath member and the rib 201 disposed around the outer periphery of the sheath pin 105.

The features of the exhaust temperature sensor 100 according to the embodiment of the invention will be described below.

Figure 2:
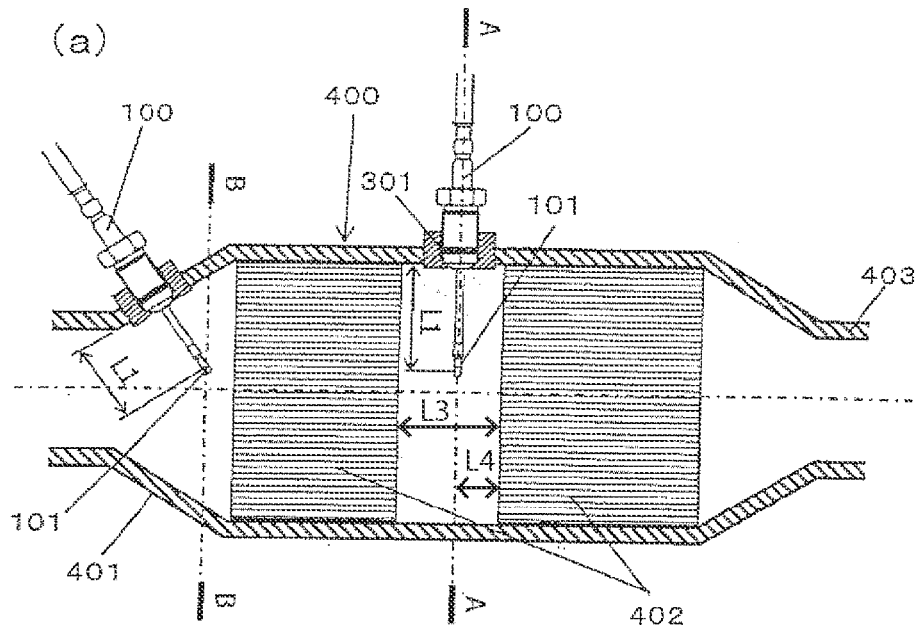
FIG. 2 is an illustration for explaining installation of an exhaust temperature sensor of the invention in an exhaust pipe 400; (a) is an axial sectional view of the exhaust pipe; and (b) is a sectional view vertical to an axis of the exhaust pipe of Fig. (a)
Figure 2:
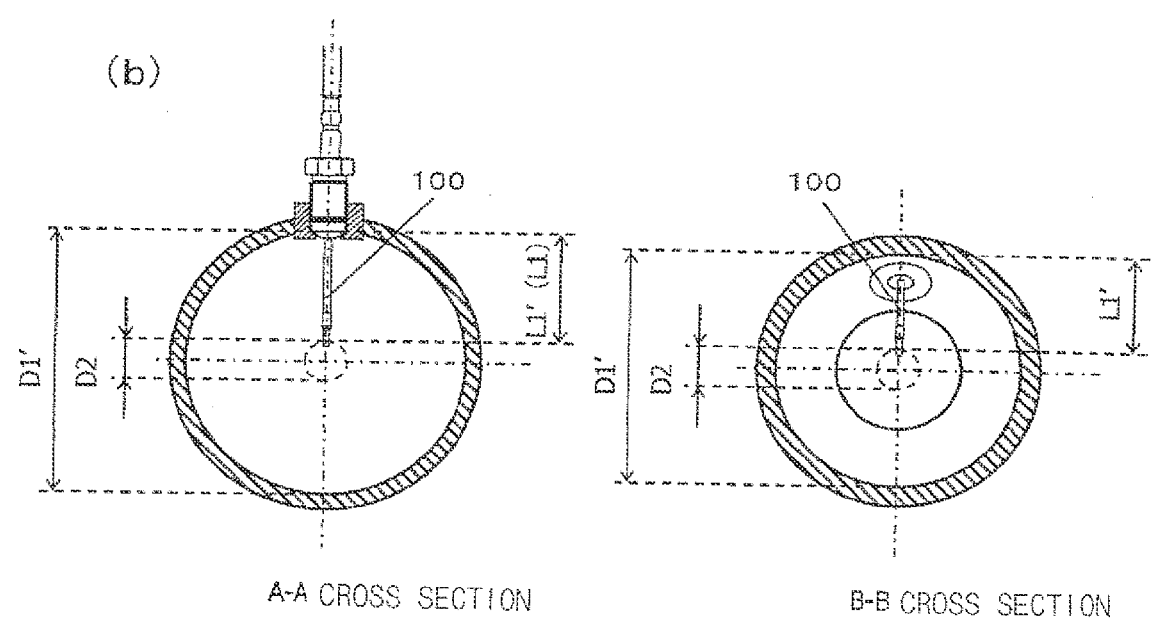

In this invention, positional relations between parts of the exhaust pipe 400 and the exhaust temperature sensor 100 and dimensions thereof are defined as illustrated in FIGS. 1 and 2.

The protruding length L1 is defined by a distance between the inner circumferential surface of the exhaust pipe 400 on the axis of the exhaust temperature sensor 100 (i.e., an intersection between an imaginary line (a broken line in FIG. 1) extending through opposed ends of the exhaust pipe 400 in which the exhaust temperature sensor 100 is installed and the axis of the exhaust temperature sensor 400) and the center of the thermister 101 (i.e., the center of an axial length of the thermister 101). The protruding length L1 is 50 mm or more.

The protruding location L1' is defined by a distance between the inner circumferential surface of the exhaust pipe 400 and the center of the thermister 101 on the cross section extending perpendicular to the axis of the exhaust pipe 400 through the center of the thermister 101.

As illustrated in FIGS. 2(a) and 2(b), in the case where the exhaust temperature sensor 100 is installed perpendicular to the axis of the exhaust pipe 400, the protruding length L1 and the protruding location L1' will be identical in dimension with each other. In the case where the exhaust temperature sensor 100 is oriented diagonally to the axis of the exhaust pipe 400, the protruding length L1 and the protruding location L1' are not necessarily identical with each other.

The held length L2 is, as illustrated in FIG. 1, is defined by a distance between the top end of the held portion where the sheath pin 105 is held or retained directly or indirectly by the rib 201 that is the holding member and the center of the thermister 101.

The flow path width D1 is defined by a distance between intersections of the axis of the exhaust temperature sensor 100 with the inner circumferential surface of the exhaust pipe 400 when the exhaust temperature sensor 100 is visually projected onto the above described cross section. The flow path width D1 is the value which may be used in the case where the exhaust pipe 400 in which the exhaust temperature sensor 100 is installed has any of various shapes such as circular and oval.

The flow path inner diameter D1' is an inner diameter of the exhaust pipe 400 defined on a cross section thereof which extends through the center of the thermister 101 perpendicular to the axis of the exhaust pipe 400. The flow path inner diameter D1' is the value which may be used effectively, especially in the case where the exhaust pipe is circular in shape.

The diameter D2 of an imaginary circle is a diameter of a circle whose radius is a distance between the center of the exhaust pipe 400 having the flow path inner diameter D1' and the center of the thermister 101.

The center outer diameter D3 is a diameter of a member which holds the thermister 101 within the protruding length L1. In FIG. 1, it is an outer diameter of the sheath pin 105.

The center of the thermister 101 is defined herein by the center of a length of the thermister 101 extending in the axial direction of the exhaust temperature sensor 100.

Figure 3:
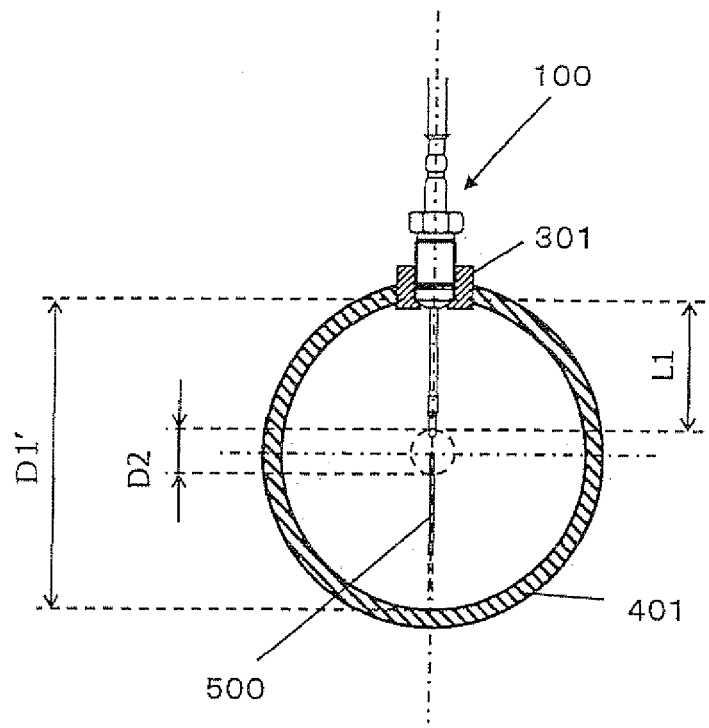
FIG. 3 is a schematic illustration for explaining a temperature correction test method by means of a thermocouple 500 using an exhaust temperature sensor 100 of the invention.
Figure 4:
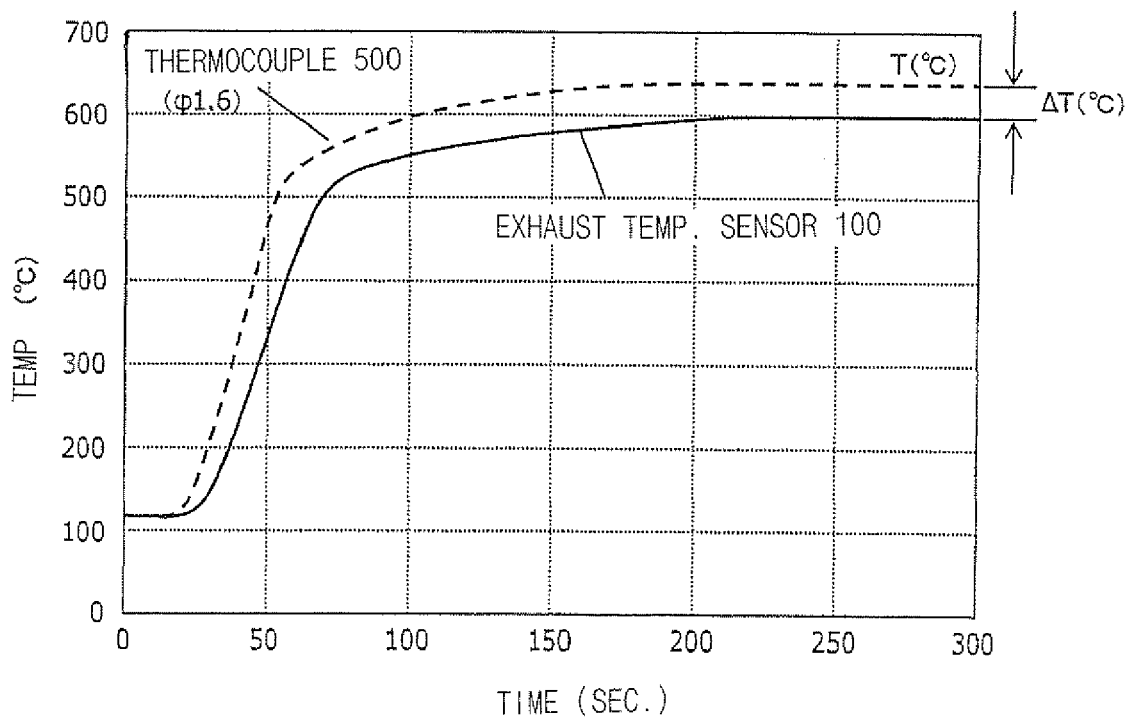
FIG. 4 is an illustration which represents results of temperature correction tests on an exhaust temperature sensor of the invention.

FIGS. 3 and 4 will be referred to below.

FIG. 3 is a schematic view which represents how to test the temperature calibration of the exhaust temperature sensor 100. The thermocouple 500 whose diameter is 1.6 mm was placed to measure the temperature of the center of the exhaust pipe 400 in which catalysts or catalyzers are disposed. The engine load was increased and then kept constant to measure the temperature through the exhaust temperature sensor 100. FIG. 4 shows comparisons between results of temperature measurement of the exhaust temperature sensor 100 and results of temperature measurement of the thermocouple 500.

The output of the thermocouple 500 was used as a reference value because the thermocouple 500 whose diameter is 1.6 mm is very low in heat transfer efficiency, so that it is possible to measure the temperature of gas inputted to the catalyzer accurately (in this case, the thermocouple 500 was disposed at the center of the catalyzer).

An error $\Delta T°$ C. relative to the output $T°$ C. of the thermocouple 500, that is, $(\Delta T/T) \times 100 (\%)$ is used as an index of accuracy of measurement (i.e., a temperature measurement error) made by the exhaust temperature sensor 100.

Figure 5:
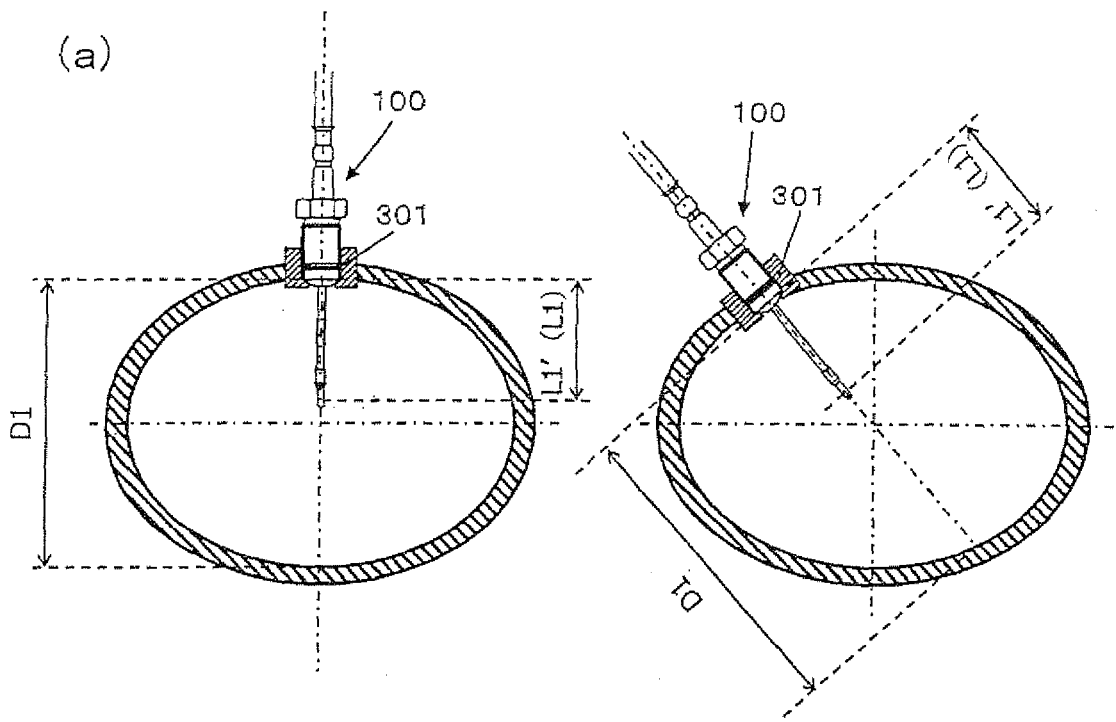
FIG. 5(a) is a sectional view vertical to an axial direction of an exhaust pipe in the case where an exhaust temperature sensor 100 of the invention is installed in the oval exhaust pipe.
FIG. 5(b) is a graph which represents evaluations of measurement errors of the exhaust temperature sensor of FIG. 5(a)
Figure 5:
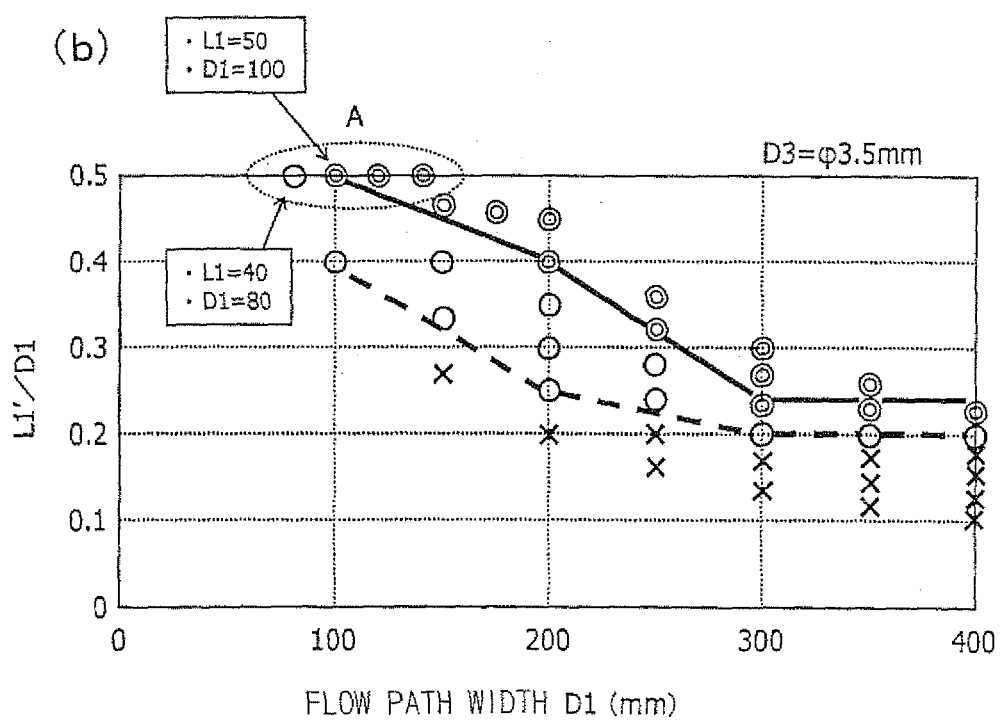

The case where the exhaust pipe 400 is oval in shape will be described with reference to FIGS. 5(a) and 5(b). FIG. 5(b) is a graph whose horizontal axis indicates the flow path width D1 and vertical axis indicates the protruding length L1' relative to the flow path width D1, that is, L1'/D1 and which represents evaluations of the temperature measurement error when the exhaust pipe 400 is oval in shape. FIG. 5 demonstrates an example where the diameter D3 of the protruding portion is 3.5 mm, and the protruding length L1 and the protruding location L1' are the same.

In the graph of FIG. 5(b), "⊙", "○", and "X" represent 10% or less, 10% or more to 15% or less, and 15% or more in the temperature measurement error $((\Delta T/T) \times 100(\%))$, respectively.

The A section, as circled by a broken line in FIG. 5(b), shows that in the case where L1'/D1=0.5, that is, the thermister 101 is placed at the center of the exhaust pipe 400, meaning that the thermocouple 500 and the exhaust temperature sensor 100 lie at substantially the same location, and where the flow path width D1 is 80 mm, and the protruding length L1 of the exhaust temperature sensor 100 extending from the inner circumferential surface of the exhaust pipe 400 is 40 mm, the temperature measurement errors are 10% or more to 15% or less, and that it is impossible to measure the temperature accurately. This is because the protruding length L1 is small, thus resulting in an increase in heat transfer, which leads to an increase in the temperature measurement error even when the temperature of the center of the exhaust pipe 400 is measured.

When the protruding length L1 is 50 mm or more, the error is found to be decreased to 10% or less, which substantially ensures the accuracy in measuring the temperature (i.e., the maximum temperature) of gas flowing into the catalyzers 402 at the center of the exhaust pipe 400. It is, therefore, advisable that the protruding length L1 be 50 mm or more because it will cause the temperature measurement error to be 10% or less.

The reason why an allowable range of the temperature error of the exhaust temperature sensor 100 is determined to be 10% or less is because 10% is an upper limit in which the temperature measurement error of the exhaust temperature sensor 100 can be corrected by an external circuit and fed back accurately.

The experimental results in FIG. 5(b) show that equations (1) to (3) below are required to be met to bring the temperature measurement error of the exhaust temperature sensor 100 to below 10%.

[Numeral 1]

$$L1'/D1 \geq \{0.6-(1/1000) \times D1\} \ (100 \text{ mm} \leq D1 < 200 \text{ mm}) \quad (1)$$

$$L1'/D1 \geq \{0.74-(1/600) \times D1\} \ (200 \text{ mm} \leq D1 < 300 \text{ mm}) \quad (2)$$

$$L1'/D1 \geq 0.24 \ (D1 \geq 300 \text{ mm}) \quad (3)$$

From the above Eqs. (1) to (3), the flow path width D1 and the protruding location L1' required to ensure the accuracy in measuring the temperature may be determined. Eqs. (1) to (3) are derived from the results in the case where the sensor outer diameter D3 is 3.5 mm. However, when the sensor outer diameter D3 is smaller than 3.5 mm, it will result in a decrease in the heat transfer, thus enabling the temperature measurement error to be decreased to 10% or less as long as Eqs. (1) to (3) are satisfied.

The case, as illustrated in FIG. 2, where the exhaust pipe 400 is circular in shape will be described below.

Figure 6:
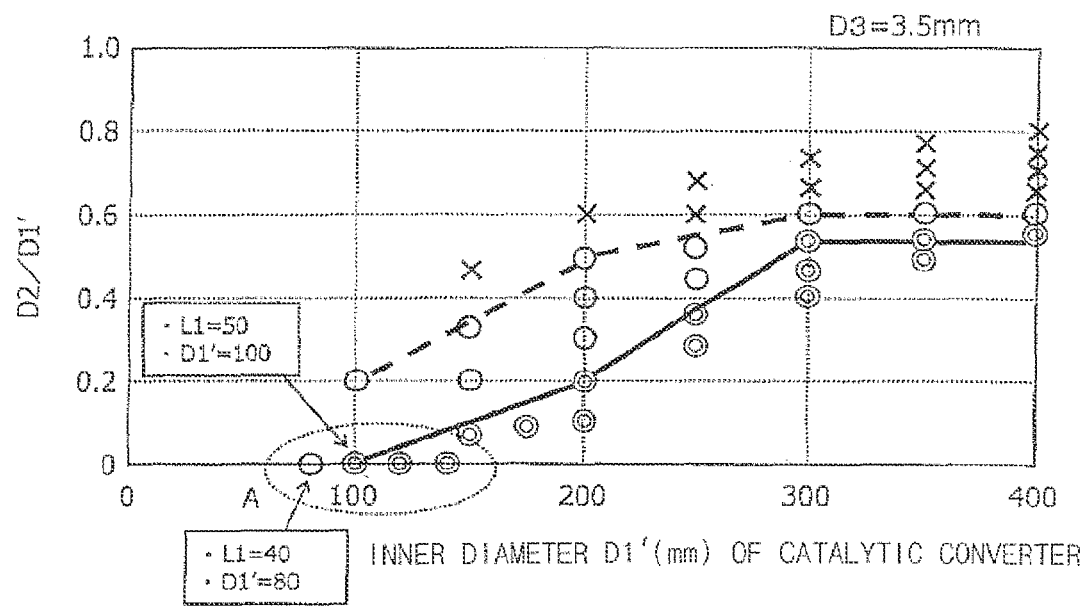
FIG. 6 is a graph which represents evaluations of side temperature errors of an exhaust temperature sensor.

FIG. 6 is a graph whose horizontal axis indicates the flow path inner diameter D1' of the exhaust pipe 400, and horizontal axis indicates the diameter D2 relative to the flow path inner diameter D1, that is, D2/D1' and which represents evaluations of the temperature measurement error $((\Delta T/T) \times 100\%)$.

FIG. 6 demonstrates an example where the diameter D3 of the protruding portion is 3.5 mm, and the protruding length L1 and the protruding location L1' are the same. In the graph of FIG. 6, "⊙", "○", and "X" represent 10% or less, 10% or more to 15% or less, and 15% or more in the temperature measurement error $((\Delta T/T) \times 100\%)$, respectively.

The A section, as circled by a broken line in FIG. 6, shows that in the case where D2/D1'=0, that is, the thermister 101 is placed at the center of the exhaust pipe 400, meaning that the thermocouple 500 and the exhaust temperature sensor 100 lie at substantially the same location, and where the flow path inner diameter D1' is 80 mm, and the protruding length L1 of the exhaust temperature sensor 100 extending from the inner circumferential surface of the exhaust pipe 400 is 40 mm, the temperature measurement errors are 10% or more to 15% or less, and that it is impossible to measure the temperature accurately. This is because the protruding length L1 is small, thus resulting in an increase in heat transfer, which leads to an increase in the temperature measurement error even when the temperature of the center of the exhaust pipe 400 is measured.

When the protruding length L1 is 50 mm or more, the error is found to be decreased to 10% or less, which substantially ensures the accuracy in measuring the temperature (i.e., the maximum temperature) of gas flowing into the catalyzers 402 at the center of the exhaust pipe 400. It is, therefore, advisable that the protruding length L1 be 50 mm or more because it will cause the temperature measurement error to be 10% or less.

It is found from FIG. 6 that the following equations (4) to (6) are needed be met to bring the temperature measurement error of the exhaust temperature sensor 100 to below 10%.

[Numeral 2]

$$D2/D1' \leq \{(1/500) \times D1'-0.2\} \ (100 \text{ mm} \leq D1' < 200 \text{ mm}) \quad (4)$$

$$D2/D1' \leq \{(1/300) \times D1'-0.47\} \ (200 \text{ mm} \leq D1' < 300 \text{ mm}) \quad (5)$$

$$D2/D1' \leq 0.53 \ (D1' \geq 300 \text{ mm}) \quad (6)$$

From the above Eqs. (4) to (6), the flow path inner diameter D1' and the diameter D2 required to ensure the desired accuracy in measuring the temperature may be determined. Eqs. (4) to (6) are derived from the results in the case where the sensor outer diameter D3 is 3.5 mm. However, when the sensor outer diameter D3 is smaller than 3.5 mm, it will result in a decrease in the heat transfer, thus enabling the temperature measurement error to be decreased to 10% or less as long as Eqs. (4) to (6) are satisfied.

The exhaust pipe 400 in which the flow path inner diameter D1' is 150 mm is used in this embodiment. The ensuring of the accuracy in measuring the temperature of gas entering the catalyzer requires use of the exhaust temperature sensor 100 which meets the relation of D2≦15 mm, as derived from Eq. (1). Here, the exhaust temperature sensor 100 is so installed in the exhaust pipe 400 that D2 may be 10 mm. In other words, the exhaust temperature sensor 100 in which the protruding length L1 is 70 mm is used. Additionally, the sensor outer diameter D3 of the sheath pin 105 retained directly by the rib 201 is 3.5 mm. In this case, the interval L3 between the two catalyzers 402 installed in the exhaust pipe 400 is 50 mm. The distance L4 between the center of the thermister 101 and an upstream end surface of the downstream catalyzer 402b is 20 mm.

Results of texts carried out along with the above evaluation tests show that when the protruding length L1 is 60 mm or more, and the sensor outer diameter D3 is 3.2 mm or less, the heat transfer is further decreased, thereby ensuring the accuracy in measuring the temperature of gas entering the catalyzer 402.

In order to avoid the breakage of the sheath pin 105 caused by vibrations exerted externally on the exhaust temperature sensor 100, the sensor outer diameter D3 that is the outer diameter of the sheath pin 105 of FIG. 1 is preferably 1.7 mm or more, thereby ensuring desired strength of the sheath pin 105.

A portion of the outer circumferential surface of the rib 201 is placed in contact with the inner circumferential surface of the protection tube 202. The protection tube 202 is welded from outside thereof to join the rib 201 and the protection tube 202.

The sheath pin 105 is fit in the center hole of the rib 201 and welded thereto at a contact between the outer circumferential surface of the sheath pin 105 and the inner circumferential surface of the rib 201. The held portion, as recited in claims, is the contact and the weld between the inner circumferential surface of the rib 201 and the outer circumferential surface of the sheath pin 105.

In the exhaust temperature sensor 100 of this invention, it is advisable that the resonance arising from vibrations transmitted from the outside be reduced. The vibrations are usually transmitted from the rib 201 to the contact and the weld between the inner circumferential surface of the rib 201 and the outer circumferential surface of the sheath pin 105, thereby causing the resonance of the sheath pin 105. The resonance, as referred to herein, is the characteristic vibration of a system having energy which is developed by stimulus (i.e., vibration) exerted externally thereon.

The held length L2 from the top end of the above described contact and welded portion of the exhaust temperature sensor 100 relative to the protruding length L1 of the exhaust temperature 100 extending from the inner circumferential surface of the exhaust pipe 400 may be prolonged more than a conventional one.

The longer the held length L2, the smaller the resonance frequency of the sheath pin 105 regardless of the protruding length L1. This is demonstrated by heat/resonance durability tests, as discussed below.

Figure 7:
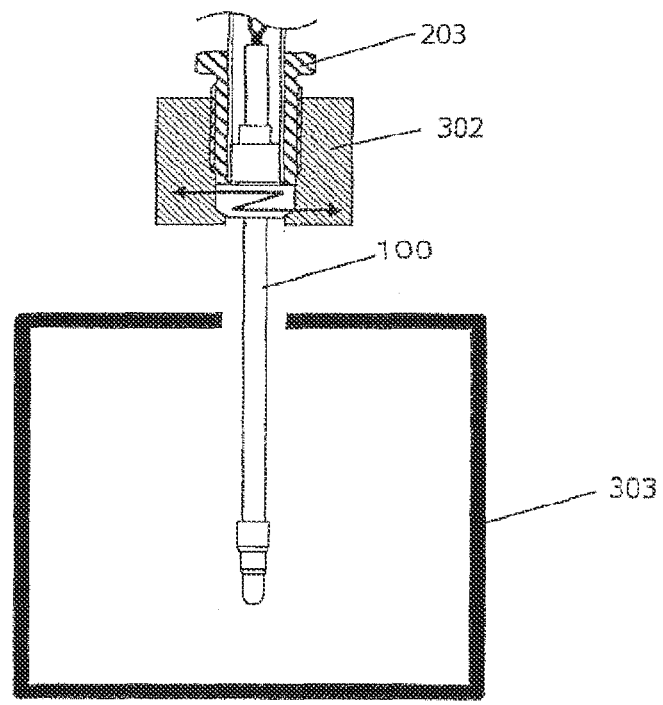
FIG. 7 is a schematic view which illustrates a heating/resonance durability test on an exhaust temperature sensor of the invention.

The heat/resonance durability tests are, as illustrated in FIG. 7, to apply acceleration to the exhaust temperature sensor 100 in the radius direction thereof while the top end of the exhaust temperature sensor 100 is being heated in an electric furnace 303. Test conditions are to place the exhaust temperature sensor 100 in the electric furnace 303 to heat the top end thereof up to 850° C., apply an acceleration of 20 G to a mount 302 in which the exhaust temperature sensor 100 is installed through the nipple 203, and at the same time sweep a frequency band near the (primary) resonance frequency of each sample (i.e., the top end of the sheath pin 105) to observe the presence of breakage of the electrode wires 102. Summarized results of such tests are listed in table 1.

TABLE 1

| Sample No. | ØD (mm) | L2 (mm) | Resonance frequency (Hz) | Judgment |
|---|---|---|---|---|
| C-1 | Ø2.3 | 45 | 808 | X |
| C-2 | | 55 | 561 | X |
| E-1 | | 60 | 478 | ○ |
| E-2 | | 65 | 412 | ○ |
| E-3 | | 70 | 359 | ◎ |
| E-4 | | 75 | 316 | ◎ |
| C-3 | Ø2.9 | 60 | 580 | X |
| C-4 | | 65 | 500 | X |
| E-5 | | 70 | 435 | ○ |
| E-6 | | 75 | 383 | ◎ |
| E-7 | | 80 | 339 | ◎ |
| C-5 | Ø3.2 | 60 | 631 | X |
| C-6 | | 65 | 544 | X |
| E-8 | | 70 | 474 | ○ |
| E-9 | | 75 | 416 | ○ |
| E-10 | | 80 | 370 | ◎ |
| E-11 | | 85 | 329 | ◎ |

X: breakage of electrode wires 102 within target time (equivalent to 300,000 km)
○: breakage of electrode wires 102 after lapse of one or two times the target time
◎: no breakage of electrode wires 102 even after elapse of two times the target time or more Table 1 shows the resonance (primary) frequency of the top end of the exhaust temperature sensor 100 and the results of the heat/resonance durability tests for different values of the sensor outer diameter D3 that is the outer diameter of the sheath pin 105 (or the temperature-sensitive portion cover 104) and the held length L2 that is the distance between the held portion of the sheath pin 105 and the center of the thermister 101.

Table 1 shows as the sensor outer diameter D3 is decreased, and the held length L2 is increased, the resonance (primary) frequency of the top end of the sheath pin 105 drops.

In Table 1, the effects of external vibration on the resonance of the top end of the sheath pin 105 is determined based on whether the electrode wires 102 have been broken or not to evaluate the vibration resistance.

Table 1 also shows that when the sensor outer diameter D3 is 3.2 mm or less, and the held length L2 is 70 mm or more, the resonance (primary) frequency of the top end of the sheath pin 105 will be 480 Hz or less, thereby avoiding the breakage of the electrode wires 102.

Some of the samples in which the resonance (primary) frequency is high are found to have the electrode wires 102 broken within the target time (i.e., stress equivalent to 30,000 km). Alternatively, some of the samples in which the resonance (primary) frequency is 480 Hz or less are found to have the life over the target time.

Further, when the held length L2 is 80 mm or more, and L1<L2, the resonance (primary) frequency of the top end of the sheath pin 105 will be 380 Hz or less, thereby improving the vibration resistance further. In other words, when the resonance (primary) frequency of the top end of the sheath pin 105 is 380 Hz or less, two times the target time or more will be reached. It is, thus, advisable that when the held length L2 is 80 mm or more, a relation of L1<L2 be satisfied.

Figure 8:
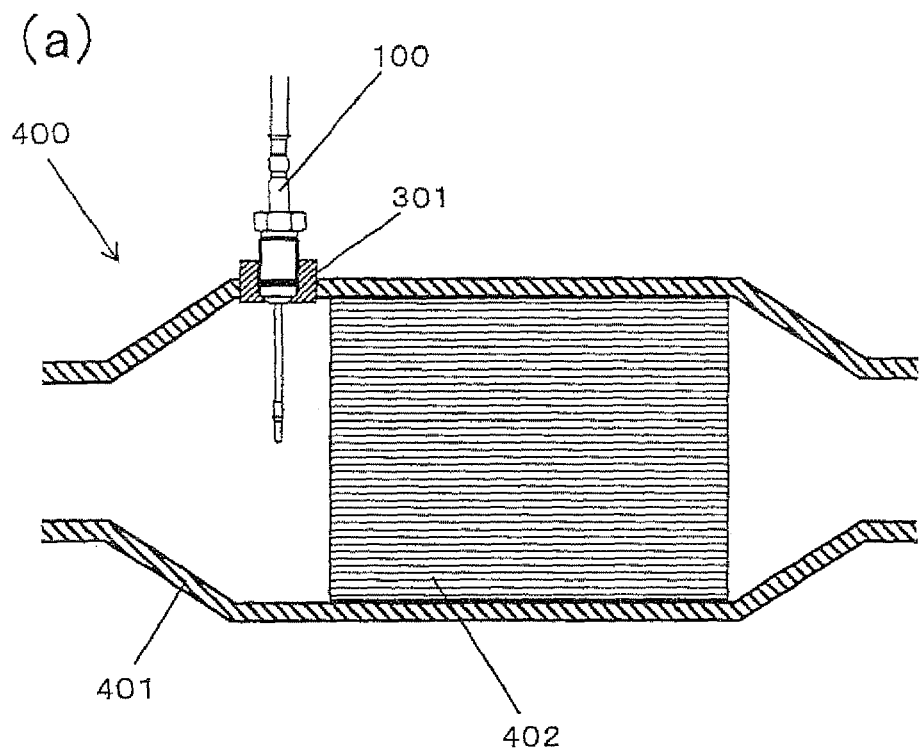
FIGS. 8(a) and 8(b) are cross sectional views for explaining a location of installation of an exhaust temperature sensor of the invention.
Figure 8:
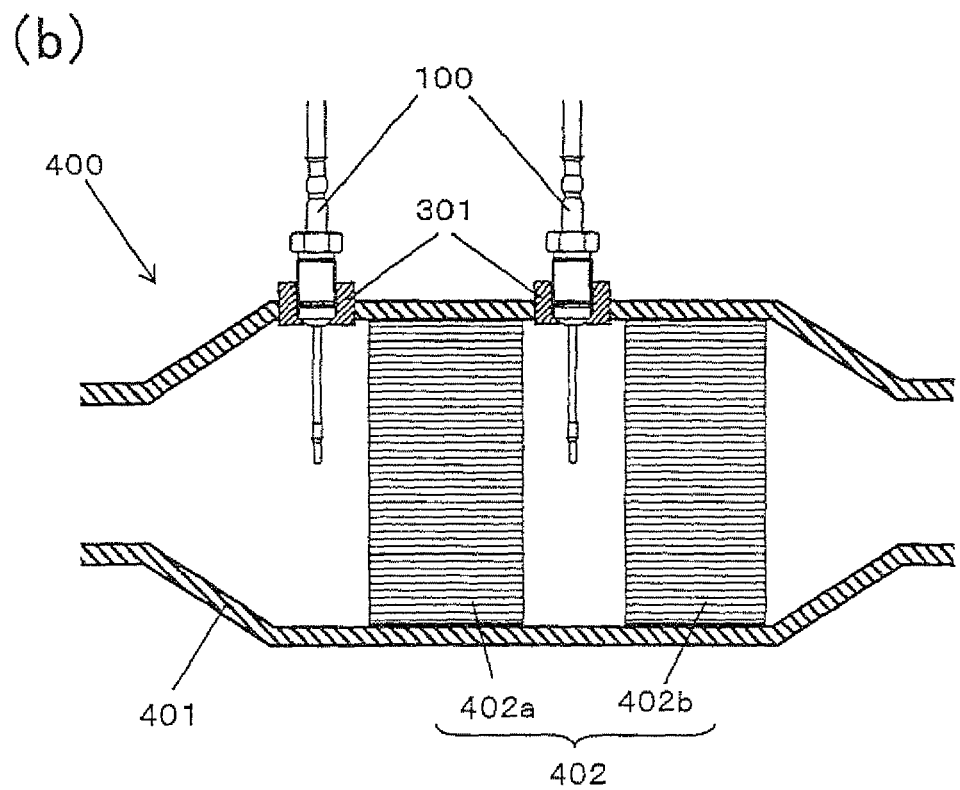

There are cases where the exhaust pipe 400, as illustrated in FIG. 8(a), has a single catalytic case 401 in which the catalyzer 402 is disposed, and the exhaust temperature sensor 100 is located upstream of the catalytic case 401 and where the exhaust pipe 400, as illustrated in FIG. 8(b), has two catalyzers 402a and 402b, and the exhaust temperature sensor 100 is interposed between the catalyzers 402a and 402b.

In this embodiment, the protruding length L1 may be increased, thereby permitting the thermister 101 equipped with the two catalyzers 402 to be disposed at the center of the exhaust pipe 400 to realize a simple structure of the exhaust system as well as to measure the temperature of gas flowing into the downstream catalyzer 402b accurately. This allows the cost to be reduced more than the conventional structure.

In the above embodiment, it is possible to measure the temperature (i.e., the maximum temperature) of gas entering the catalyzers 402 accurately, thus permitting the temperature of the catalyzers 402 to be controlled finely. This results in decrease in vibration of the top end of the sheath pin 105 as well as improved fuel consumption, reduced emissions, avoidance of deterioration of the catalyst, thus providing the exhaust temperature sensor 100 which is excellent in durability.

The exhaust temperature sensor 100 may be disposed downstream of the catalyers 402 if the exhaust temperature sensor 100 is disposed with a portion extending outside the exhaust pipe 400 in the radius direction thereof.

In the above embodiment, the rib 201 and the sheath pin 105 are place in contact with each other and welded together at the contact, but however may be joined, as discussed below, using an additional member.

Other embodiments of the exhaust temperature sensor 100f the invention will be described with reference to FIGS. 9 to 11.

For example, in FIG. 1, the temperature-sensitive portion cover 104 is so fixed as to surround a portion of the outer circumferential surface of the top end side of the sheath pin 105. The temperature-sensitive portion cover 104 may be designed, as illustrated in FIG. 9, to be long enough to capsulate the sheath pin 105 therein. The temperature-sensitive portion cover 104 and the rib 201 may be welded at the base ends thereof to achieve the same effects as in the embodiment described above. A fixing member 106 may be disposed between the inner circumferential surface of the temperature-sensitive portion cover 104 and the outer circumferential surface of the sheath pin 105.

Figure 9:
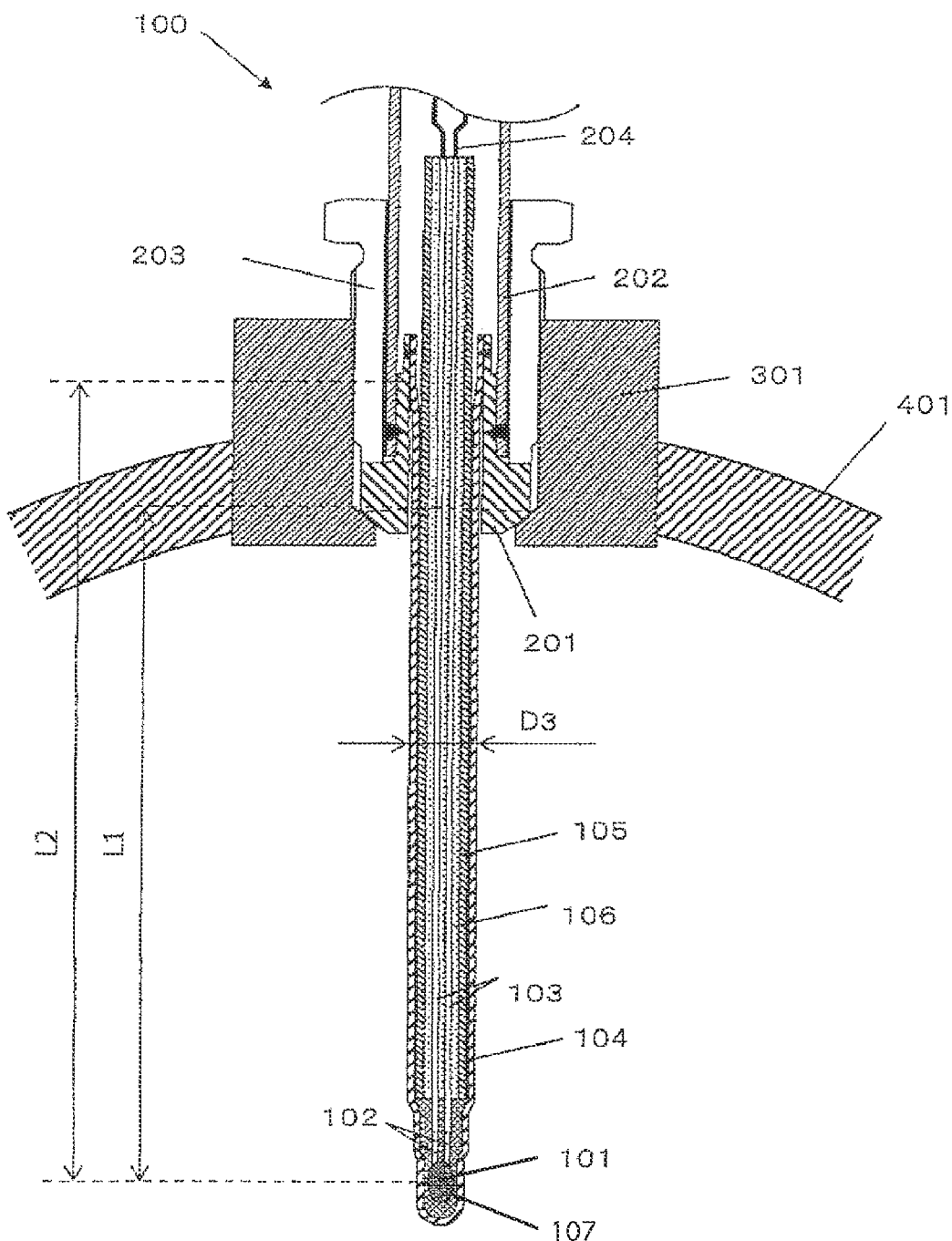
FIG. 9 is a cross sectional view which shows another embodiment of an exhaust temperature sensor of the invention.

In FIG. 9, the outer diameter of a portion of the temperature-sensitive portion cover 104 (i.e., a portion covering the sheath pin 105) other than a relatively smaller-diameter end portion thereof is defined as the sensor outer diameter D3.

Figure 10:
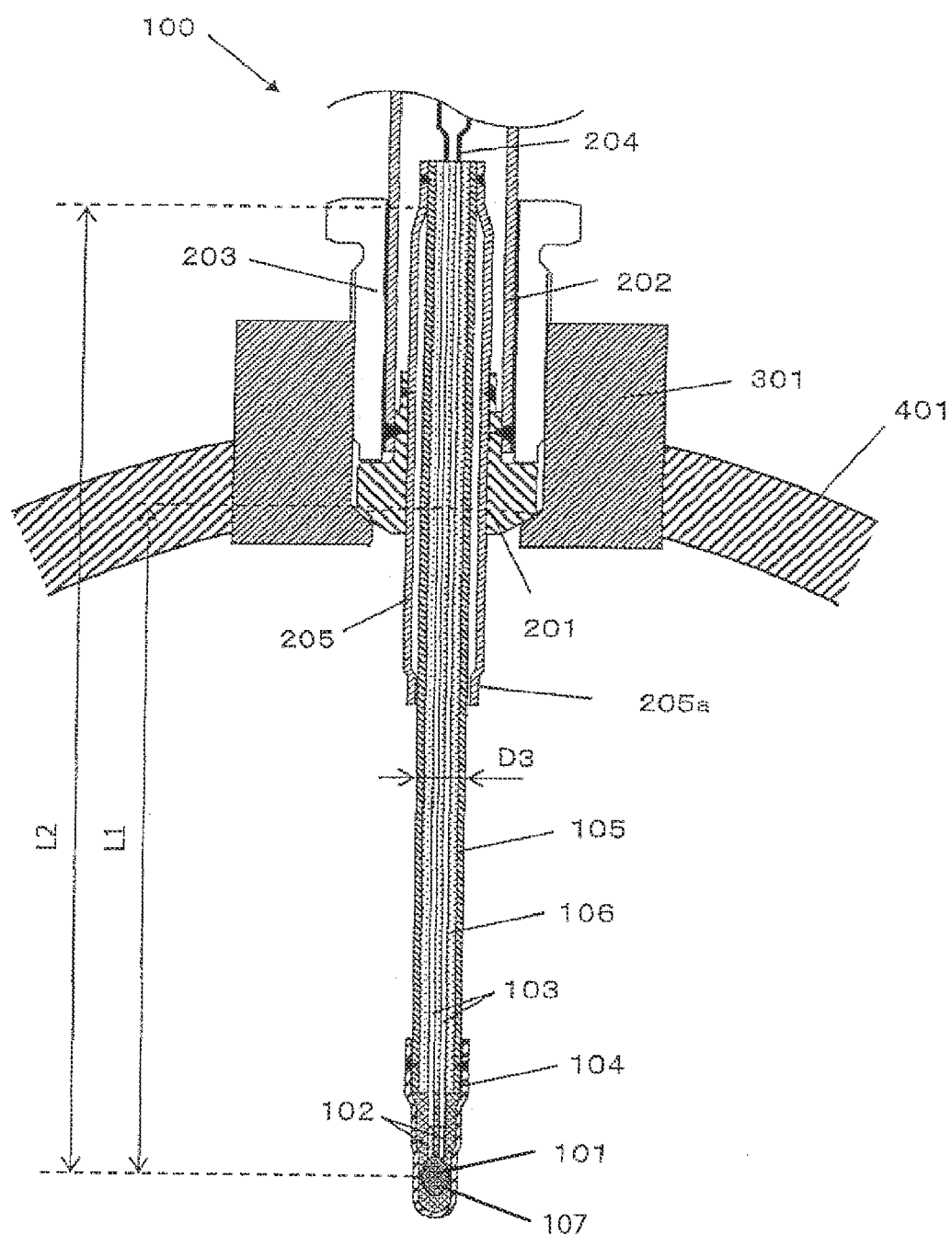
FIG. 10 is a cross sectional view which shows another embodiment of an exhaust temperature sensor of the invention.

As illustrated in FIG. 10, a holder tube 205 may be disposed between the inner circumferential surface of the rib 201 and the outer circumferential surface of the sheath pin 105 to retain the sheath pin 105. Additionally, the holder tube 205 may have a relatively smaller-diameter portion formed on the top end thereof as a top end interference portion 205a. In this case, a clearance is formed between the inner circumferential surface of the holder tube 205 and the outer circumferential surface of the sheath pin 105, thereby minimizing the vibration transmitted externally to the sheath pin 105 and also causing the top end interference portion 205a to interfere with the sheath pin 105 when the sheath pin 105 vibrates or resonates to absorb such vibration. In FIG. 10, the temperature-sensitive portion cover 104 is so fixed as to wrap the outer circumferential portion of the top end of the sheath pin 105 partially, but however, it may be, as illustrated in FIG. 9, designed to cover the whole of the sheath pin 105.

In FIG. 10, the outer diameter of the sheath pin 105 is defined as the sensor outer diameter D3.

Figure 11:
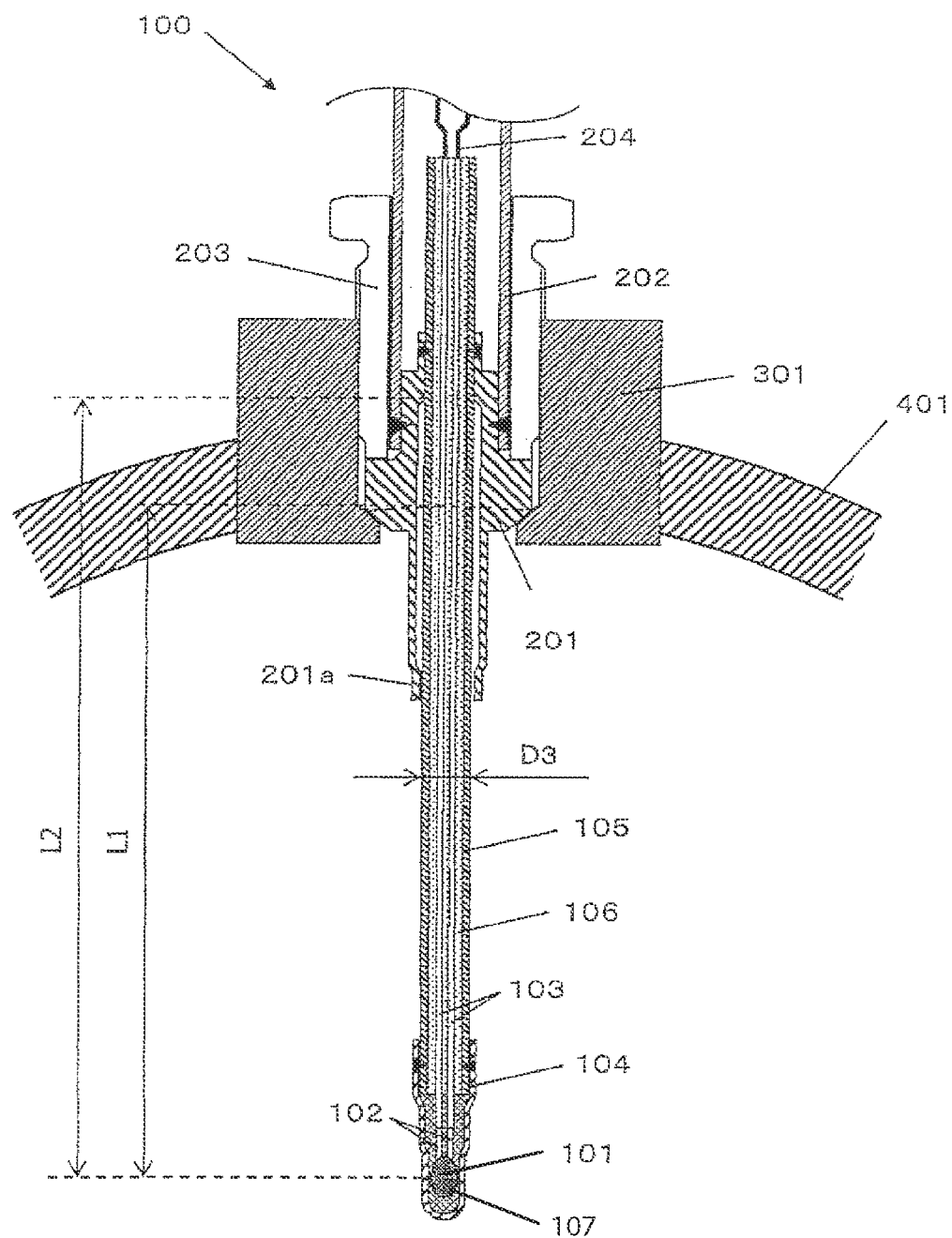
FIG. 11 is a cross sectional view which shows another embodiment of an exhaust temperature sensor of the invention.
Figure 12:
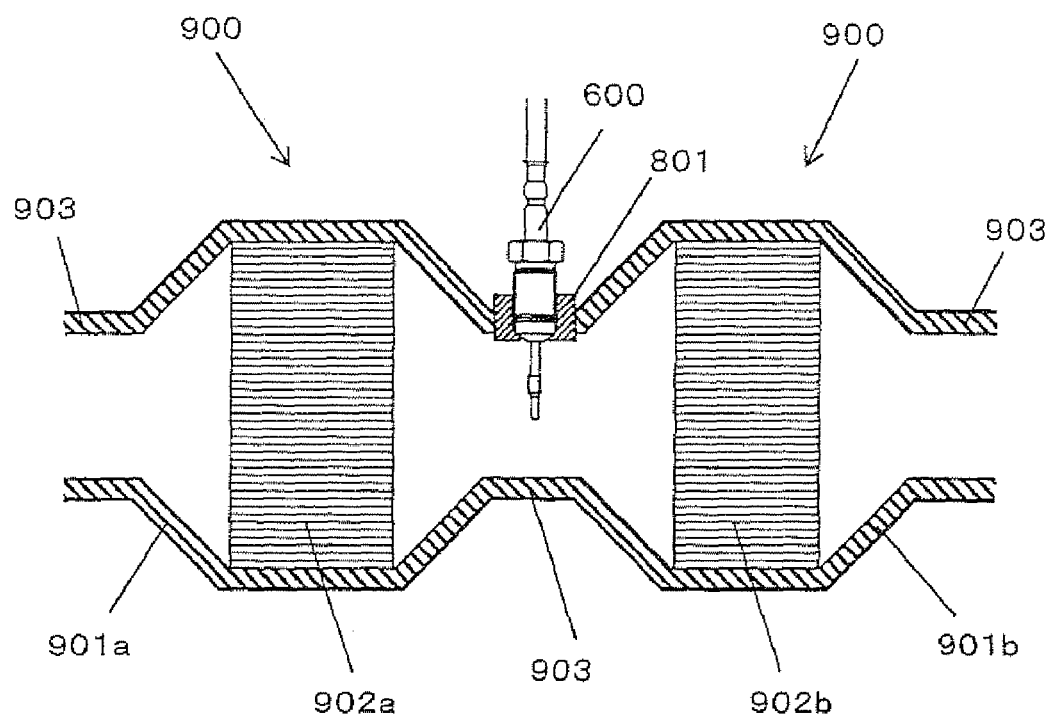
FIG. 12 is a cross sectional view of installation of a conventional exhaust temperature sensor 600 in an exhaust pipe 903.

The rib 201 may be, as illustrated in FIG. 11, designed to the top end extending to wrap the sheath pin 105 more. In this case, a clearance is formed between the inner circumferential surface of the rib 201 and the outer circumferential surface of the sheath pin 105, thereby minimizing, like in FIG. 10, the vibration transmitted externally to the sheath pin 105. Additionally, the rib 201 may have a relatively smaller-diameter portion formed on the top end thereof as a top end interference portion 201a, like the top end interference portion 205a. When the sheath pin 105 vibrates or resonates, the top end interference portion 201a interferes with the sheath pin 105 to absorb such vibration.

In FIG. 11, the outer diameter of the sheath pin 105 is, like in FIG. 10, defined as the sensor outer diameter D3.

If the top end interference portions 201a and 205a are not restrained fully through the laser welding, they may be disposed to have a clearance of, for example, 0.1 mm or alternatively in contacting abutment with the sheath pin 105 without any air gap.

The structures of the exhaust temperature sensor 100 and the exhaust pipe 400 may be modified in various ways without departing from the principle of the invention.

The invention claimed is:

1. A temperature sensor including a temperature sensitive device which is disposed in a flow path through which fluid flows and whose electric characteristic changes as a function of temperature of the fluid in the flow path, signal lines connected at top end sides thereof to said temperature sensitive device through electrode wires and at base end sides thereof to lead wires for connection with an external circuit, a sheath member retaining the signal lines therein, and a holding member which holds an outer circumferential surface of said sheath member directly or indirectly through another member, wherein a protruding length L1 that is a distance between an inner circumference of said flow path on an axis of the temperature sensor and a center of said temperature sensitive device is 50 mm or more, and if a protruding location that is a distance between an inner circumferential surface of the flow path and a center of said temperature sensitive device on a cross section extending perpendicular to an axis of the flow path through the center of said temperature sensitive device is defined as L1', and a flow path width that is a distance between intersections of the axis of the temperature sensor with the inner circumferential surface of the flow path when the temperature sensor is projected onto said cross section is defined as D1, a relation below is met:

$L1'/D1 \geq \{0.6-(1/1000) \times D1\}$ when 100 mm $\leq D1 <$ 200 mm, $L1'/D1 \geq \{0.74-(1/600) \times D1\}$ when 200 mm $\leq D1 <$ 300 mm, or $L1'/D1 \geq 0.24$ when 300 mm $\leq D1$.

a percent error of the temperature sensitive device is maintained below a predetermined value, wherein the percent error is 15% or less.

2. A temperature sensor as set forth in claim 1, wherein if a held length that is a distance between a top end of a portion of said sheath member which is held by the holding member directly or indirectly and the center of said temperature sensitive device is defined as L2, a relation to the protruding length L1 is L2>L1.

3. A temperature sensor as set forth in claim 2, wherein the sensor outer diameter D3 is 1.7 mm or more.

4. A temperature sensor as set forth in claim 1, wherein if a diameter of a portion of the protruding length L1 which holds said temperature sensitive device is defined as a sensor outer diameter D3, the sensor outer diameter D3 is 3.5 mm or less.

5. A temperature sensor as set forth in claim 4, wherein the protruding length L1 is 60 mm or more, and the sensor outer diameter D3 is 3.2 mm or less.

6. A temperature sensor as set forth in claim 1, wherein the temperature sensor is disposed between at least two catalyzers installed in the flow path.

7. A temperature sensor as set forth in claim 6, wherein if an interval between the adjacent two catalyzers is defined as L3, and a distance between the center of said temperature sensitive device and an upstream end surface of one of the catalyzers which is located downstream of the flow path is defined as L4, a relation of L4<(L3)/2 is met.

8. A temperature sensor as set forth in claim 1, wherein said temperature sensitive device is disposed inside a metallic cover.

9. A temperature sensor as set forth in claim 1, wherein said temperature sensitive device is implemented by a thermister.

10. A temperature sensor as set forth in claim 1, wherein said temperature sensitive device is embedded in a fixing member supplied inside a top end of said metallic cover.

11. A temperature sensor as set forth in claim 1, wherein said temperature sensitive device is sealed by glass.

12. A temperature sensor as set forth in claim 1, wherein the percent error is 10% or less.

13. A temperature sensor including a temperature sensitive device which is disposed in a flow path through which fluid flows and whose electric characteristic changes as a function of temperature of the fluid in the flow path, signal lines connected at top end sides thereof to said temperature sensitive device through electrode wires and at base end sides thereof to lead wires for connection with an external circuit, a sheath member retaining the signal lines therein, and a holding member which holds an outer circumferential surface of said sheath member directly or indirectly through another member, wherein a protruding length L1 that is a distance between an inner circumference of said flow path on an axis of the temperature sensor and a center of said temperature sensitive device is 50 mm or more, and if a flow path inner diameter on a cross section extending through the center of said temperature sensitive device perpendicular to an axis of the flow path is defined as D1', and a diameter of a circle whose radius is a distance between a center of the flow path having the flow path inner diameter D1' and the center of said temperature sensitive device is defined as D2, a relation below is met, $D2/D1' \leq \{(1/500) \times D1' - 0.2\}$ when 100 mm$\leq D1' <$200 mm, $D2/D1' \leq \{(1/300) \times D1' - 0.47\}$ when 200 mm$\leq D1' <$300 mm, or $D2/D1' \leq 0.53$ when 300 mm$\leq D1'$.

a percent error of the temperature sensitive device is maintained below a predetermined value,
wherein the percent error is 15% or less.

14. A temperature sensor as set forth in claim 13, wherein the percent error is 10% or less.

* * * * *